United States Patent [19]
Jekowski et al.

[11] 3,761,717
[45] Sept. 25, 1973

[54] AUTOMATIC SENSITIVITY ADJUSTMENT IN FLASH BLINDNESS PROTECTIVE DEVICE

[75] Inventors: Edward W. Jekowski, Brighton; Kenneth J. Foster, Dedham, both of Mass.

[73] Assignee: The United States of America as represented by the Secretary of the NaVy, Washington, D.C.

[22] Filed: May 15, 1972

[21] Appl. No.: 253,269

[52] U.S. Cl. .............................. 250/209 R, 250/214
[51] Int. Cl. ............................................. H01j 39/12
[58] Field of Search ........................... 350/160, 269; 250/201, 206, 209, 229, 214, 83.3; 315/149, 155, 156, 157, 158, 159

[56] References Cited
UNITED STATES PATENTS

| | | | |
|---|---|---|---|
| 3,389,259 | 6/1968 | Zarem | 350/269 |
| 3,548,197 | 12/1970 | Nordmann | 350/269 |
| 3,321,630 | 5/1967 | Durig | 250/209 |
| 3,400,270 | 9/1968 | Durig | 250/206 |
| 3,273,458 | 9/1966 | Kohler | 250/229 |

*Primary Examiner*—James W. Lawrence
*Assistant Examiner*—D. C. Nelms
*Attorney*—R. S. Sciascia et al.

[57] ABSTRACT

Automatic sensitivity adjustment for day-night operation in flash blindness protective apparatus is obtained by supplying an electrical signal produced by a light detector in response to transient light through a differentiator circuit to a first comparator which provides an output signal if the differentiated electrical signal exceeds a first predetermined amplitude. If the electrical signal produced by the light detector in response to ambient light exceeds a predetermined maximum at a second comparator, the second comparator supplies an output signal to the first comparator to change the first predetermined amplitude to a second predetermined amplitude. An output signal from the first comparator initiates operation of eye protective measures. An interlock switching circuit provides protection from high voltages when the apparatus is not in use.

10 Claims, 3 Drawing Figures

3,761,717

AUTOMATIC SENSITIVITY ADJUSTMENT IN FLASH BLINDNESS PROTECTIVE DEVICE

STATEMENT OF GOVERNMENT INTEREST

The invention described herein may be manufactured and used by or for the Government of the United States of America for governmental purposes without the payment of any royalties thereof or therefor.

BACKGROUND OF THE INVENTION

The present invention generally relates to automatic switching systems and more particularly to their use in flash blindness protective systems for protecting the human eye from intense flashes of light.

The intense flash of light emitted by a nuclear detonation can cause flash blindness or even retinal burns to an unprotected eye. Photocrhomic goggle systems have been developed with rapid response to protect the eyes during such detonations. One such system is disclosed by Frederick E. Barstow et al. in U. S. Pat. No. 3,152,215 issued Oct. 6, 1964. Prior systems, however, fail to take into account the difference in protection needed during daytime and at night. At nightime the dilation of the pupil is much greater than the daytime and an increase in light that would be relatively safe during the daytime could cause severe problems to an eye adapted to the dark. Thus, prior systems are set so that a certain intensity of light triggers a safety device and this level is low enough that an eye adapted for the nightime is protected. However, systems set at such levels often trigger from a number of false alarm sources in daytime when, in fact, such a threshold level is not required to protect the eyes.

SUMMARY OF THE INVENTION

Accordingly, it is a general purpose and object of the present invention to provide a system that automatically adjusts itself to different threshold levels for daytime and nighttime operations. It is a further object of the present invention to provide an interlock circuit that provides protection from high voltages when the system is not in use.

According to the present invention this is accomplished by supplying the electrical output of light sensors to a light detector module that determines whether the ambient light is that of day or night and upon such determination supplies an output signal if the output of the sensor should exceed the maximum intensity permitted for either the day or night mode of operation for which the light detector module is automatifally automatically This output of the light detector is utilized to fire an electric flash circuit that renders photochromic goggle lenses opaque. Thus, in one prior art electric flash system it is applied to a spark gap trigger through a clamp circuit. The spark gap trigger fires upon receipt of a signal from the light detector module when the clamp circuit is in the unclamped condition. The output of the spark gap trigger fires a spark gap rendering it conductive. This enables the energy storage capacitors to operate the flash circuit. The ultraviolet light produced renders the photochromic lenses of the goggles opaque. In addition, an interlock circuit provides protection from high voltages and inhibits the light detector module from supplying an output signal.

DESCRIPTION OF THE PREFERRED EMBODIMENT

Figure 1:
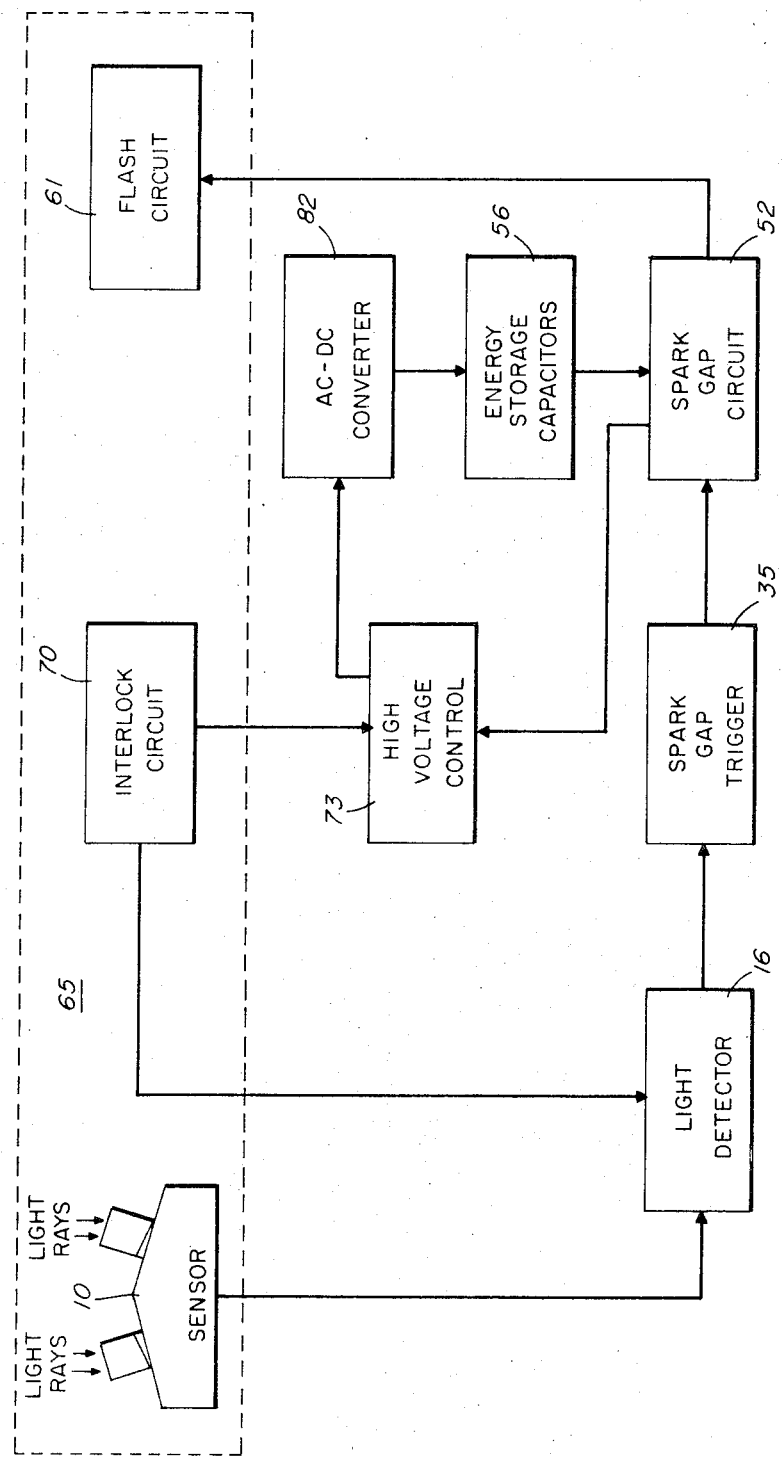
FIG. 1 is a block diagram of an apparatus incorporating the present invention.
Figure 2:
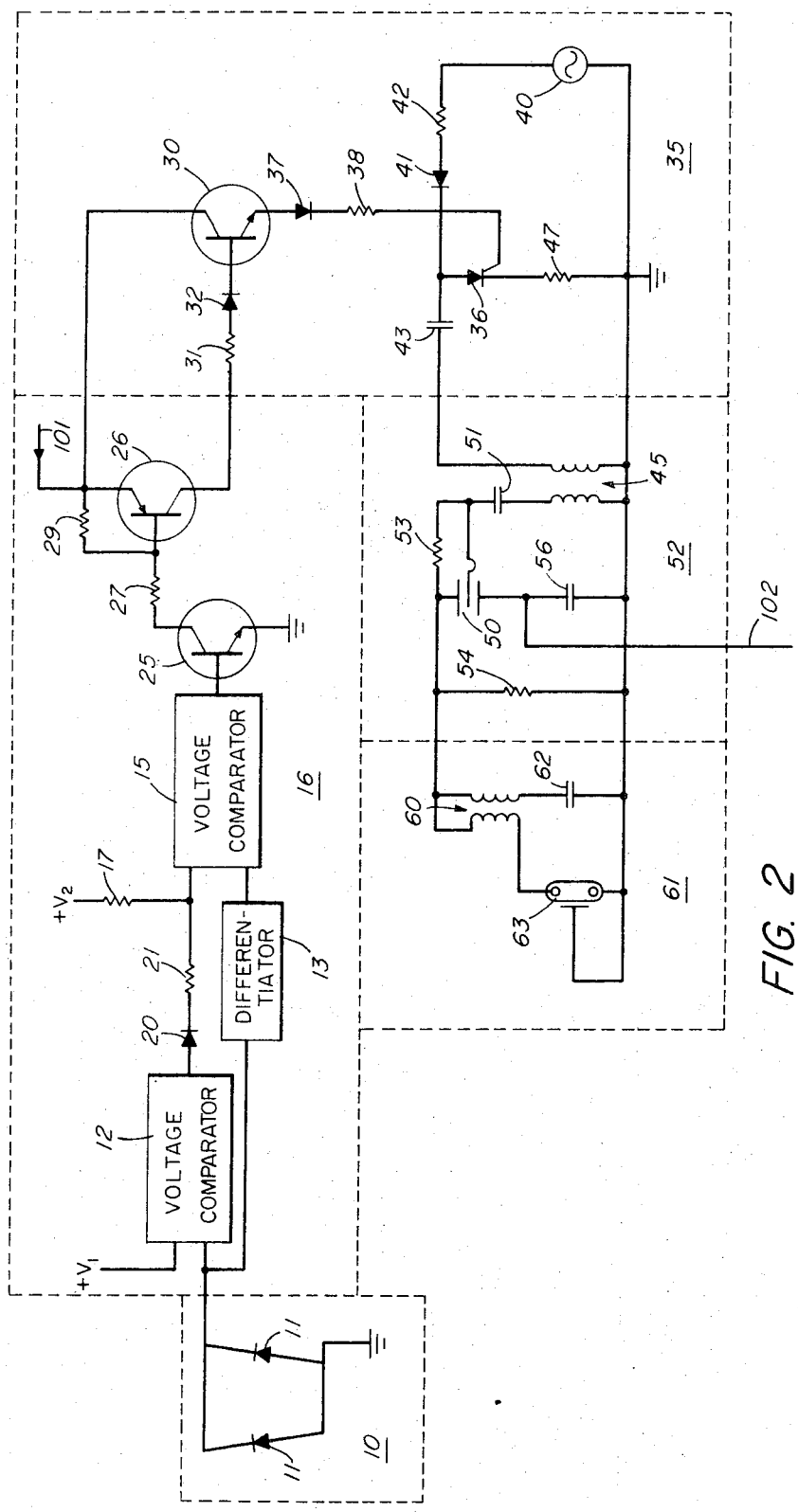
FIG. 2 illustrates in schematic-block diagram form the present invention in part in combination with a prior art electric flash system.

Referring now to FIGS. 1 and 2, a light sensor 10 comprising a pair of identical photodiodes 11 connected in parallel to allow overlap of their half power points supply electrical signals indicative of the light rays received. Generally considered, photodiodes 11 produce a signal having two parts, first signals representing transient light changes and a second signal representing the ambient light level encountered. The light sensor 10 is physically located in goggles 65 which are used in conjunction with a helmet (not shown).

The electrical signals are supplied to a first comparator 12 and differentiator 13 within light detector system 16. Differentiator 13 differentiates the first signal and ignores the second ambient signal. Differentiator 13 is band limited and may comprise an operational amplifier circuit with both high and low bandpass filtering (not shown). Comparator 12 compares the second ambient signal from diodes 11 to a voltage reference $+V_1$ and supplies an output signal to second comparator 15 through diode 20 and resistor 21 if the second signal from diodes 11 exceeds a predetermined value indicating that the day threshold has been exceeded and that detector system 16 is to be set for day operation. The signal from differentiator 13 is also applied to comparator 15. If the incoming second ambient signal from diodes 11 fails to operate comparator 12, then a signal $+V_2$ applied to comparator 15 through resistor 17 determines the night time level that the output from differentiator 13 must exceed to generate an output from comparator 15. If, however, comparator 12 is rendered operative a day time level takes effect at comparator 15 that must be exceeded by the signal from differentiator 13. This associated circuitry is set so that when the light rate of rise exceeds 2.3 $\mu w/cm^2/\mu s$ (night threshold) or 24 $\mu w/cm^2/\mu s$ (day threshold) of 9K A equivalent light for ramps in the band limited range of 100 $\mu s$ to 2 ms an output trigger signal from comparator 15 is generated. This trigger signal may be utilized to fire an electric flash system such as the prior art system hereinafter described.

The output of comparator 15 may also be applied to the base of an NPN transistor 25 which in turn is connected to a PNP transistor 26 through a resistor 27 for use in the interlock system. Thus, the emitter of transistor 26 receives a positive bias signal from line 101 when interlock circuit 70 conducts. Dropping resistor 29 connects between the emitter and base of transistor 26 so that both transistors 25 and 26 are rendered conductive upon receiving a positive output signal from comparator 15 indicative that the threshold to which comparator 15 is set has been exceeded. Neither conducts in the absence of a bias signal from line 101 when interlock circuit 70 is non-conductive. When in this condition, any output from comparator 15 has no effect upon the system.

The collector electrode of transistor 26 may be connected to a prior art spark gap trigger circuit by way of NPN transistor 30 through a resistor 31 and diode 32 as shown. Transistor 30 likewise may have its collector connected to receive positive bias from line 101 similarly to the emitter of transistor 26. When transistor 26 becomes conductive, transistor 30 conducts supplying a signal to the gate electrode of silicon controlled rectifier 36 through diode 37 and resistor 38.

The prior art spark gap trigger circuit 35 has an a.c. power supply 40 that charges capacitor 43 through resistor 42, diode 41 and the primary winding of transformer 45. The signal from transistor 30 renders SCR 36 conductive and capacitor 43 discharges through the primary winding of transformer 45, resistor 47 and SCR 36. This induces a high voltage trigger pulse in the secondary winding of transformer 45.

The secondary winding of transformer 45 connects to the trigger electrode of spark gap 50 through capacitor 51 in spark gap circuit 52. The trigger electrode of spark gap 50 connects through resistor 53 to the upper main electrode of spark gap 50. The main electrodes of spark gap 50 also connect in a series loop with main energy storage capacitor 56, the secondary winding of transformer 45, capacitor 51 and resistor 53. Lead 102 supplies d.c. charging voltage to main energy storage capacitor 56. Resistors 53 and 54 prevent the building up of stray charges on the electrodes of spark gap 50 prior to triggering.

The high voltage trigger pulse induced in the secondary winding of transformer 45 is applied in series with the voltage on charged capacitor 56 across the lower main electrode and trigger electrode of spark gap 50, causing spark gap 50 to ionize and become conductive.

Flash circuit 61 has two parallel branches. The series connection of high voltage capacitor 62 and the primary winding of transformer 60 connects in parallel across resistor 54. Similarly, the series connection of the main electrodes of flashtube 63 and the secondary winding of transformer 60 connects in parallel across resistor 54. The trigger electrode of flashtube 63 is grounded.

When spark gap 50 becomes conductive, capacitor 56 commences to charge capacitor 62 through the primary winding of transformer 60. This charging pulse induces a high voltage pulse in the secondary winding of transformer 60 which may be on the order of 15 to 20 kilovolts peak and have a duration on the order of one microsecond. This high voltage pulse adds in series with the voltage on capacitor 56. The sum of these voltages applied across the main electrodes of flashtube 63 causes the xenon gas in the flashtube to ionize. Concurrently the sum of these voltages is applied between the trigger electrode and the upper main electrode of flashtube 63 further ensuring ionization of the xenon gas in flashtube 63. As soon as ionization occurs flashtube 63 becomes conductive and main discharge capacitor 56 discharges through the flashtube producing both visible light and ultraviolet light which activates the photochromic material in the lenses of the goggles.

Figure 3:
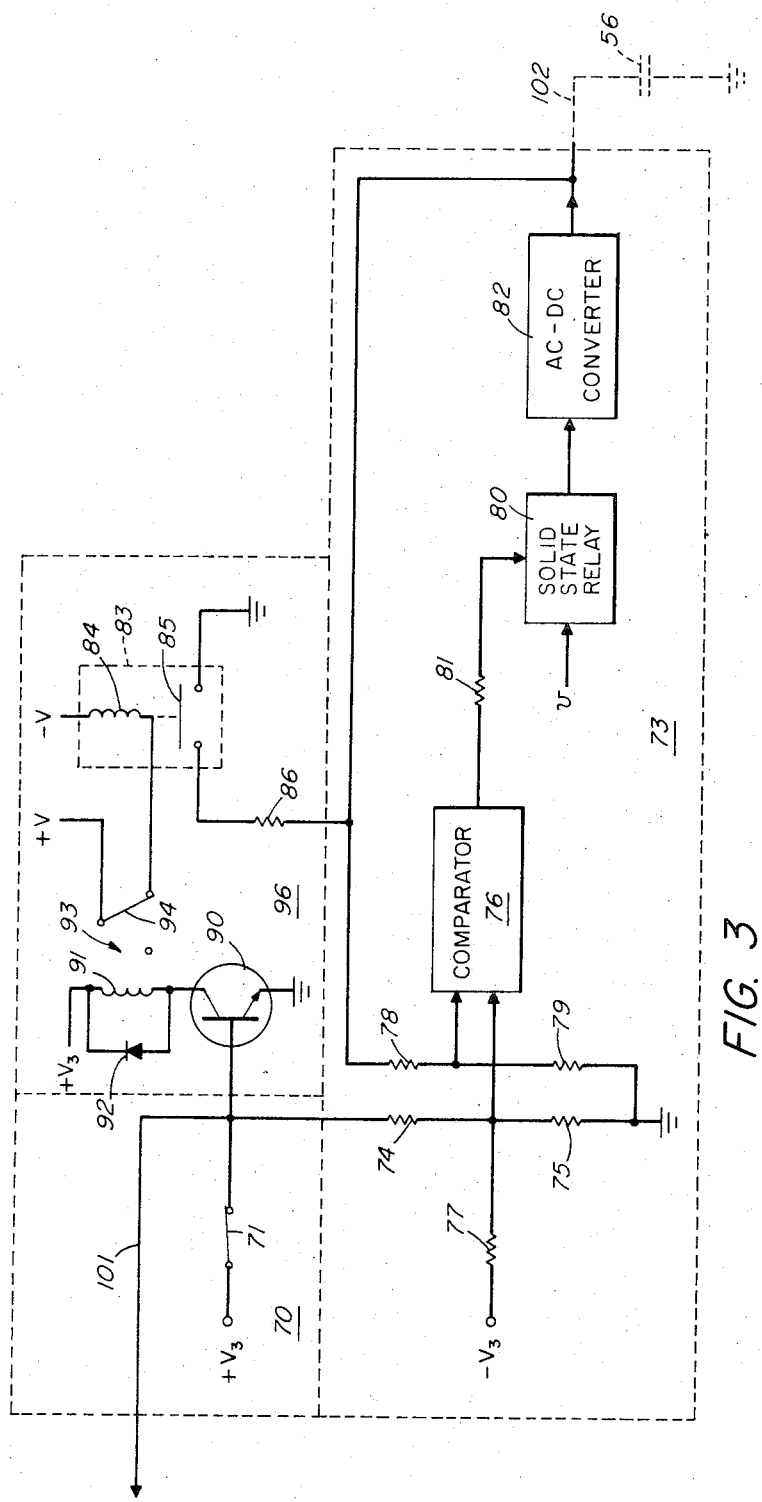
FIG. 3 illustrates in schematic-block diagram form the interlock system of the present invention.

Referring now to FIG. 3 the interlock circuit 70 comprises a microswitch 71 located in a helmet (not shown) and is actuated to the closed position when the helmet is worn and switches to the open position when the helmet is removed from the head. High voltage control 73 connects to switch 71 by means of a voltage divider circuit comprising resistors 74 and 75 connected in series and grounded. Comparator 76 connects to the junction between resistors 74 and 75. Voltage bias $+V_3$ applies a reference voltage to comparator 76 when microswitch 71 is closed through resistors 74 and 75. Voltage bias $-V_3$ connects to the same terminal of comparator 76 through resistor 77. Thus, when switch 71 is open the terminal of comparator 76 assumes negative bias and upon closure of switch 71 it assumes a positive bias. A negative bias on this terminal renders comparator 76 inoperative. The other input to comparator 76 is supplied by input lead 102 from main energy storage capacitor 56 through resistors 78 and 79, the other terminal being connected to the junction of these resistors.

When switch 71 is open, comparator 76 is inoperative and solid state relay 80 is open between a.c. voltage V and a.c. - d.c. converter 82. This inhibits charging of main energy storage capacitor 56. When switch 71 is closed and capacitor 56 is charged to a predetermined value, comparator 76 likewise is rendered inoperative, preventing further charging of capacitor 76. However, when switch 71 is closed and the voltage on capacitor 76 is below said predetermined value comparator 76 becomes operative, closing solid state relay 80, completing the circuit between a.c. voltage V and a.c. - d.c. converter 82, thus permitting capacitor 56 to charge.

Capacitor discharge relay 83 for discharging capacitor 56 comprises coil 84 and normally closed switch contacts 85 connected to capacitor 56 through resistor 86 and lead 102. The discharge of capacitor 56 is controlled by microswitch 71 that is connected to the base of transistor 90 that has its emitter grounded and whose collector is connected to coil 91 in parallel with diode 92 of relay 93. When switch 71 is closed voltage $+V_3$ passes through coil 91 and transistor 90 closes switch contact 94 as shown. This causes coil 84 to be energized from voltage supplis $+V$ and $-V$ through switch 94 and opens switch contacts 85 as shown. On switch 71 opening the switch 94 transfers to the open position causing switch contacts 85 to close. Capacitor 56 thereupon discharges to ground through resistor 86.

It will be remembered that light detector 16 can produce an output signal on the collector of transistor 26 only if voltage $+V_3$ is available on line 101. Thus, when switch 71 is open, there is no signal output at light detector 16.

The operation of the device will now be explained with reference to the FIGURES. It is assumed power is being supplied to the system and microswitch 71 is closed. If photodiodes 11 sense the ambient light of daytime voltage, comparator 12 is actuated setting voltage comparator 15 at a predetermined level. If the diodes 11 sense that it is nighttime, voltage comparator 12 is not actuated and the level of voltage comparator 15 is set by the signal $+V_2$ through resistor 17. On diodes 11 sensing a rapid increase in light, a signal sent to voltage comparator 15 through differentiator 13 causes an output signal from voltage comparator 15 to be applied to the base of transistor 25 causing transistor 25 to conduct. If the helmet is being worn a signal is then received on lead 101 and a voltage drop developed across resistor 29 renders transistor 26 condcutive. This, in, turn, turns on transistor 30 which supplies a signal to fire SCR 36. The firing of SCR 36 causes capacitor 43 to discharge through the primary of transformer 45. The high voltage pulse induced in the secondary of transformer 45 fires spark gap 50 rendering it conductive. Capacitor 56 furnishes a charging pulse through the primary winding of transformer 60 to charge capacitor 62. This induces a high voltage pulse in the secondary winding of transformer 60. The sum of this high voltage pulse and the voltage on capacitor 56 is applied to the electrodes of flashtube 63 causing the xenon gas therein to ionize. When ionization occurs capacitor 56 discharges through flashtube 63 producing visible light and ultraviolet light. This ultraviolet light activates the photochromic material, and in a manner of speaking "closes" the goggles. Photochromic activation from electric flash tubes is well known to those skilled in the art.

There has therefore been disclosed apparatus for automatically operating at different threshold levels for day and night to prevent flash blindness during either. The apparatus further has an interlock system that protects against high voltages when operation of the apparatus is not necessary.

It will be understood that various changes in the details, materials, steps and arrangements of parts, which have been herein described and illustrated in order to explain the nature of the invention, may be made by thse skilled in the art without departing from the spirit of the invention or the scope of the following claims.

What is claimed is:

1. An automatic sensitivty adjustment system for night and day operation comprising:
    light-sensitive detector sensors for providing an output signal indicative of the light received;
    first comparator means for comparing said sensors output signal with a predetermined signal and providing an output signal if said ensors output signal is larger than said predetermined signal; sensors
    a differentiator connected to receive said sensors output signal for providing an output signal that is indicative of the rate of change of said sensors output signal;
    first signal means connected to receive said first comparator means output for providing a first signal level in the presence of said first comparator means output signal and a second signal level in the absence of said first comparator means output signal; and
    second comparator means connected to receive said first signal means output signal and said differentiator output signal for providing an output signal when said differentiator output signal is larger than said first signal means output signal.

2. An automatic sensitivity adjustment system according to claim 1 wherein said light-sensitive detector sensors include a pair of photo diodes connected in parallel.

3. An automatic sensitivity adjustment system according to claim 2 further comprising:
    interlock system means connected to said second comparator means for inhibiting an output signal when said automatic sensitivity adjustment system is not in use.

4. In flashblindness protective apparatus having photochromic goggles activated by ultraviolet light produced by operation of an electric flash system having a main energy storage capacitor that is charged and then discharged through an electric flashtube to produce the ultraviolet light, the improvement for daytime and nighttime operation comprising:
    light-sensitive detectors for providing an output signal indicative of ambient light levels and transient changes in light intensities;
    first comparator means for comparing that portion of the detectors' signal indicative of the ambient light level with a predetermined signal and providing an output signal if said portion of the detectors' signal exceeds the predetermined signal;
    a differentiator connected to receive the detectors' output signal for providing output signals indicative of the rates of change of those portions of the detectors' output signal indicative of transient changes in light intensities;
    first signal means connected to receive the output signal from the first comparator means for providing a first signal level in the presence of an output signal from the first comparator means and a second signal level in the absence of an output signal from the first comparator means;
    said second comparator means connected to receive the output signal level from the first signal means and the output signals from the differentiator for providing output signals when the output signals from the differentiator exceed the output signal levels from the first signal means; and
    means connecting the second comparator means to the electric flash system for actuating the electric flash system in the presence of an output signal from the second comparator.

5. The improvement as in claim 4 in which the predetermined signal is set at a threshold level corresponding to the ambient light level for daytime operation.

6. The improvement as in claim 5 in which:
    the first signal level from the first signal means corresponds to daytime operation; and
    the second signal level from the first signal means corresponds to nighttime operation.

7. The improvement as in claim 6 in which the first signal means further comprises a predetermined voltage source for providing the second signal level.

8. The improvement as in claim 4 further comprising interlock circuit means connected to the second comparator means for inhibiting an output signal therefrom when the apparatus is not in use.

9. The improvement as in claim 8 in which the interlock circuit means further comprises means for inhibiting charging of the main energy storage capacitor.

10. The improvement as in claim 9 in which the interlock circuit means further comprises means for discharging the main energy storage capacitor when the apparatus is not in use.

* * * * *